United States Patent [19]

Nemes et al.

[11] Patent Number: 4,626,411

[45] Date of Patent: Dec. 2, 1986

[54] COMPOSITION AND METHOD FOR DEOXYGENATION

[75] Inventors: John J. Nemes; Harvey W. Thompson; John E. Waller, all of Mississauga, Canada

[73] Assignee: Dearborn Chemical Company, Limited, Mississauga, Canada

[21] Appl. No.: 724,230

[22] Filed: Apr. 17, 1985

[30] Foreign Application Priority Data

Apr. 18, 1984 [CA] Canada .................................. 452270

[51] Int. Cl.$^4$ .................. C23F 11/06; C02F 1/70; C09K 3/00
[52] U.S. Cl. ......................................... 422/13; 422/16; 210/750; 210/757; 252/178; 252/188.28; 252/391; 252/392; 252/393
[58] Field of Search ................... 252/178, 188.28, 391, 252/392, 393; 210/749, 750, 757; 422/13, 16

[56] References Cited

U.S. PATENT DOCUMENTS

| | | | |
|---|---|---|---|
| 3,843,547 | 10/1974 | Kaufman et al. | 252/393 X |
| 4,067,690 | 1/1978 | Cuisia et al. | 21/2.7 R |
| 4,124,500 | 11/1978 | Arghiropoulos et al. | 252/188.28 X |
| 4,278,635 | 7/1981 | Kerst | 422/14 |
| 4,279,767 | 7/1981 | Muccitelli | 252/178 |
| 4,282,111 | 8/1981 | Ciuba | 252/178 |
| 4,289,645 | 9/1981 | Muccitelli | 252/178 |
| 4,350,606 | 9/1982 | Cuisia et al. | 252/392 |
| 4,549,968 | 10/1985 | Muccitelli | 252/392 X |

FOREIGN PATENT DOCUMENTS 57-204288A 12/1982 Japan .

Primary Examiner—John F. Terapane
Assistant Examiner—Matthew A. Thexton
Attorney, Agent, or Firm—W. W. McDowell, Jr.; David E. Heiser

[57] ABSTRACT

A composition containing a hydroxylamine compound; a quinone, a dihydroxybenzene, a diaminobenzene, or an aminohydroxybenzene compound; and a neutralizing amine is an excellent oxygen scavenger and corrosion inhibitor in boiler water and other aqueous systems.

20 Claims, No Drawings

COMPOSITION AND METHOD FOR DEOXYGENATION

The present invention relates to inhibition of corrosion of metal surfaces in contact with an aqueous system by reducing the oxygen and carbon dioxide content of the system.

The presence of dissolved gases such as oxygen and carbon dioxide can cause severe corrosion of metal surfaces in boilers, heat exchangers, and other aqueous systems. Oxygen can cause pitting and carbon dioxide can produce grooving of the metal surfaces. Pitting and grooving are highly concentrated types of corrosion that affect only a small area of the total metal surface. This severe localized corrosion can cause metal failure and the corrosion products may block flow lines in the system.

In boiler systems, corrosion due to the presence of oxygen may occur in feed lines, the boiler, steam lines, steam condensate return lines, and other parts of the system. Carbon dioxide also contributes to corrosion of steam and steam condensate return lines. Carbonate or bicarbonate compounds are frequently added to make boiler feedwater alkaline and decompose at the boiler operating temperatures to produce carbon dioxide with the steam.

In order to inhibit corrosion due to oxygen and carbon dioxide, boiler systems are treated with oxygen scavengers and neutralizing amines. The scavengers deoxygenate the water by reacting with oxygen to form oxygen-containing compounds and the amines neutralize carbon dioxide.

U.S. Pat. No. 4,067,690 of Cuisia et al. discloses that hydroxylamine and certain derivatives thereof are highly effective oxygen scavengers in boiler water. The hydroxylamines may be catalyzed with any of a number of well known catalysts used in sodium sulfite or hydrazine boiler water treatment. Alkali metal hydroxide, water soluble metal salts, hydroquinone, and benzoquinone are also useful catalysts. U.S. Pat. No. 4,278,635 of Kerst describes the use of hydroquinone and other dihydroxy, diamino, and aminohydroxy benzenes and their lower alkyl substituted derivatives as boiler water oxygen scavengers. As disclosed in U.S. Pat. No. 4,350,606 of Cuisia et al., the use of a hydroxylamine compound and a volatile, neutralizing amine such as cyclohexylamine, morpholine, diethylaminoethanol, dimethylpropanolamine, or 2-amino-2-methyl-1-propanol prevents corrosion in boiler systems by carbon dioxide grooving or channeling attack and oxygen pitting attack. U.S. Pat. Nos. 4,279,767 and 4,289,645 of Muccitelli disclose the use of a hydrazine-free solution of hydroquinone and certain neutralizing amines such as methoxypropylamine and diethylaminoethanol as an oxygen scavenger for boiler water and other aqueous media.

The composition of the present invention comprises corrosion-inhibiting amounts of a hydroxylamine compound; a quinone, a dihydroxybenzene, a diaminobenzene, or an aminohydroxybenzene compound; and a neutralizing amine. In accordance with the method of the present invention, corrosion-inhibiting amounts of a hydroxylamine compound; a quinone, a dihydroxybenzene, a diaminobenzene, or an aminohydroxybenzene compound; and a neutralizing amine are added to an aqueous system.

The present invention provides unexpectedly superior oxygen scavenging and inhibition of corrosion caused by oxygen and carbon dioxide. The presence of the quinone or benzene compound and the neutralizing amine provides an unexpectedly high increase in the rate of reaction of the hydroxylamine compound and oxygen. The removal of oxygen is rapid enough even at relatively low temperatures to provide immediate corrosion protection in the boiler feedwater and steam condensate systems. The composition may be free of hydrazine and thus avoid its toxicity.

At least one hydroxylamine compound is used in the present invention. The hydroxylamine compound may be, for example, hydroxylamine, its oxygen-substituted and nitrogen-substituted derivatives, and their water soluble salts such as the chloride, sulfate, acid sulfate, phosphate, and sulfite. Preferred hydroxylamine compounds are those having the general formula

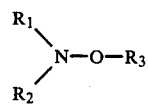

in which $R_1$, $R_2$ and $R_3$ are either the same or different and are selected from the group consisting of hydrogen, lower alkyl and aryl, or a water soluble salt of these compounds. The lower alkyl group may generally have from 1 to 8 carbon atoms and the aryl group may be, for example, phenyl, benyzl, or tolyl. Suitable hydroxylamine compounds include hydroxylamine; N,N-diethylhydroxylamine; hydroxylamine hydrochloride; hydroxylammonium acid sulfate; hydroxylamine phosphate; N-ethylhydroxylamine; N,N-dimethylhydroxylamine; O-methylhydroxylamine; N-hexylhydroxylamine; O-hexylhydroxylamine; N-heptylhydroxylamine; N,N-dipropylhydroxylamine; O-methyl N,N-diethylhydroxylamine; N-octylhydroxylamine; O-ethyl N,N-dimethylhydroxylamine, N,N-diethylhydroxylamine hydrochloride; N-methyl-N-ethylhydroxylamine; O-methyl N-propylhydroxylamine; N-methyl N-propylhydroxylamine; O-methylhydroxylamine phosphate; N-butylhydroxylamine; O-pentylhydroxylamine; N-benzylhydroxylamine; O-benzylhydroxylamine; and N,N-diethylhydroxylamine acetate. N,N-diethylhydroxylamine, hydroxylamine, hydroxylamine hydrochloride, and hydroxylammonium acid sulfate are preferred and N,N-dimethylhydroxylamine is especially preferred.

Another component of the present invention is at least one quinone, dihydroxybenzene, diaminobenzene, or aminohydroxybenzene compound or a lower, e.g., 1 to 8 carbon atoms, alkyl substituted derivative thereof. Hydroquinone is especially preferred. Other suitable compounds include benzoquinone, napthoquinone, catechol, 4-tert-butylcatechol; 2,4 diaminophenol; 5-methyl-o-aminophenol; o-aminophenol; p-aminophenol; 3-methyl-p-aminophenol; 4,6 diamino 2-methyl phenol; p-methylaminophenol; m-aminophenol; p-(N-methylamino)phenol; o-(N-butylamino)phenol; 3,4-dihydroxybenzaldehyde; and 2,5-dihydroxybenzaldehyde. Inorganic water soluble acid addition salts such as chloride and sulfate salts of these compounds may also be used. Preferred compounds are those having the general formula.

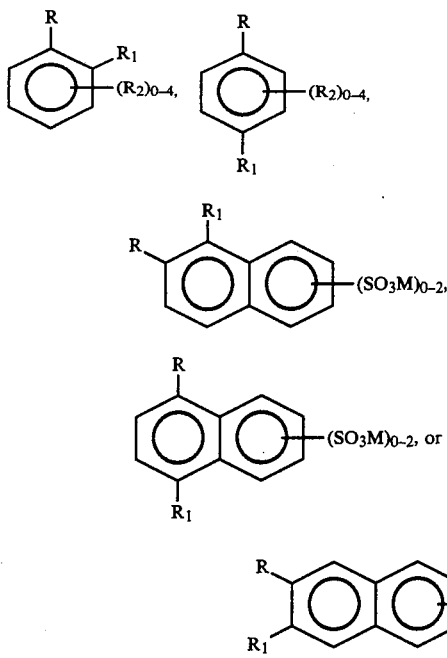

in which R and $R_1$ are independently selected from the group consisting of —OH, —NH$_2$, and combinations thereof; $R_2$ (when present) is lower alkyl containing 1 to 8 carbon atoms; and M is selected from the group consisting of H, Na, K and combinations thereof.

The final component is at least one neutralizing amine. Neutralizing amines are volatile so that they reach the areas contacted by steam and carbon dioxide and react with carbon dioxide dissolved in the condensed steam of the boiler condenstate system. Typical suitable neutralizing amines include morpholine; cyclohexylamine; diethylaminoethanol; dimethyl(iso)-propanolamine; 2-amino-2-methyl-1-propanol; dimethylpropylamine; benzylamine; 1,2-propanediamine; 1,3-propanediamine; ethylenediamine; 3-methoxypropylamine; triethylenetetramine; diisopropanolamine; dimethylaminopropylamine; mononethanolamine; sec-butylamine; tert-butylamine; monoisopropanolamine; hexamethylenediamine; and triethylenediamine. Neutralizing amines are well known in boiler water treatment. See H. H. Uhlig, "Corrosion and Corrosion Control", pp. 252–253, John Wiley & Sons, Inc. (1963). Diethylaminoethanol is highly preferred.

The composition of the present invention comprises corrosion inhibiting amounts of each component. The composition has a weight ratio of the hydroxylamine compound to the neutralizing amine of generally from about 10:1 to about 1:1,500, preferably of from about 10:1 to about 1:10, and especially of from about 5:1 to about 1:1. The weight ratio of the quinone or benzene compound to the neutralizing amine is generally from about 10:1 to about 1:100, preferably from about 5:1 to 1:50, and especially from about 1:1 to about 1:10.

The amount of the composition added to the water will vary with the dissolved oxygen concentration, temperature, and pH of the aqueous system. Since oxygen may enter a system from both the feedwater and other sources, an excess amount of oxygen scavenger is used to provide a residual amount in the water. The composition is added to the system in an amount of generally from about 0.001 to about 10,000; preferably from about 0.01 to about 1,500; and especially from about 0.1 to about 100 parts per million (ppm) of system water.

The components may be added separately or in the form of a composition at any location where they will be quickly and efficiently mixed with the water of the system. When used in boiler treatment, for example, the treatment chemicals may be added to the boiler feedwater lines through which water enters the system and/or to the condensate lines. Typically, an injector calibrated to deliver a predetermined amount periodically or continously to the water is employed.

Generally, the composition will be added in the form of an aqueous solution comprising from about 0.1 to about 70 percent by weight of the composition and preferably from about 1 to about 40 weight percent. The solutions can be made by adding the ingredients to water in any order.

The present invention is especially useful in the treatment of boiler water systems such as in a steam generating boiler. Such boiler systems are generally operated at a temperature of from about 298° to about 637° F. and a pressure of from about 50 to about 2,000 psig and of from about 900 to about 2,000 psig for high pressure systems.

In aqueous systems that are not operated at elevated temperatures, it is preferred that the water have an alkaline pH, for example, of greater than about 7.5, preferably of about 8.5 to 12, and especially of from about 9 to about 11. Although high dosages might perform the necessary oxygen scavenging with the composition of this invention, an alkaline pH is more economical. Boiler feedwater generally is treated with alkali which may be introduced separately or in combination with the oxygen scavenger to provide the alkaline pH.

The composition and method of this invention are illustrated by the following examples in which all parts are by weight unless otherwise indicated.

EXAMPLES

Aqueous solutions containing 29.75 parts of N,N-diethylhydroxylamine, 2 or 5 parts of hydroquinone, and 10 parts of a neutralizing amine were prepared. Control solutions containing the same amount of the hydroxylamine and hydroquinone but no neutralizing amine and of the hydroxylamine and a neutralizing amine but no hydroquinone were also prepared.

The oxygen scavenging properties of these solutions were evaluated in a 1.5 liter glass vessel at 45° C. and at a dosage of 104 ppm in deionized water adjusted to pH 9 with sodium hydroxide. The oxygen level in the water was measured with a YSI Model 54A oxygen meter fitted with a recorder. The results of the tests are shown in the following table.

| Amine | Parts of Hydro-quinone | Run | Oxygen Level (ppm after) | | | |
|---|---|---|---|---|---|---|
| | | | 0 min. | 5 min. | 20 min. | 40 min. |
| cyclohexylamine | 2 | 1 | 6.0 | 2.2 | 0.6 | 0.3 |
| diethylaminoethanol | 2 | 2 | 6.0 | 1.3 | 0.2 | 0.2 |
| 2-amino-2-methyl-1-propanol | 2 | 3 | 6.0 | 3.5 | 2.0 | 1.6 |
| 1,2-propanediamine | 2 | 4 | 6.0 | 2.4 | 0.7 | 0.3 |
| 1,3-propanediamine | 2 | 5 | 6.0 | 1.9 | 0.9 | 0.5 |
| ethylene diamine | 2 | 6 | 6.0 | 3.3 | 1.75 | 1.4 |
| none | 2 | 7 | 6.0 | 5.5 | 4.5 | 3.4 |
| diethylaminoethanol | 5 | 8 | 6.0 | 0.4 | 0.2 | 0.2 |
| 1,3-propanediamine | 5 | 9 | 6.0 | 0.0 | 0.0 | 0.0 |
| none | 5 | 10 | 6.0 | 4.2 | 1.8 | 0.8 |

| Amine | Parts of Hydroquinone | Oxygen Level (ppm after) Run | 0 min. | 5 min. | 20 min. | 40 min. |
|---|---|---|---|---|---|---|
| 1,3-propanediamine | 0 | 11 | 5.9 | 5.3 | 3.3 | 1.5 |

The results demonstrate that the combination of neutralizing amine and hydroquinone causes a very unexpectedly large increase in the rate of reaction of the diethylhydroxylamine with oxygen. All of the amines brought about a very rapid drop in oxygen levels when compared to the effect of hydroquinone, as shown in Runs 7 and 10, or a neutralizing amine, as shown in Run 11, alone on the diethylhydroxylamine reaction rate.

We claim:

1. A composition which is useful for inhibiting corrosion due to the presence of oxygen in aqueous systems comprising:

(a) at least one hydroxylamine compound having the general formula

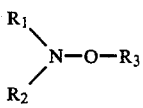

in which $R_1$, $R_2$ and $R_3$ are either the same or different and are selected from the group consisting of hydrogen, lower alkyl and aryl, or a water soluble salt of said hydroxylamine compound;

(b) at least one compound having the general formula:

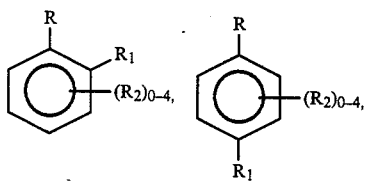

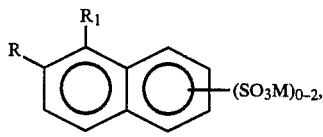

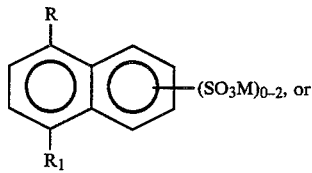

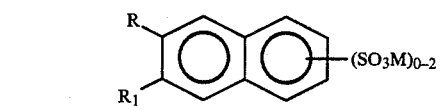

in which R and $R_1$ are independently selected from the group consisting of —OH, —$NH_2$; $R_2$ is lower alkyl containing 1 to 8 carbon atoms; and M is selected from the group consisting of H, Na, K and combinations thereof; and (c) at least one neutralizing amine; the weight ratio of the hydroxylamine compound component to the neutralizing amine component being between about 10:1 to about 1:10, and the weight ratio of the quinone or benzene compound component to the neutralizing amine component being between about 10:1 to about 1:100.

2. The composition of claim 1 in which component (a) is N,N diethylhydroxyl amine.

3. The composition of claim 2 in which component (b) is hydroquinone.

4. The composition of claim 1 in which component (b) is hydroquinone.

5. The composition of claim 1 in which the weight ratio of component (a) to component (c) is from about 5:1 to about 1:1 and the weight ratio of component (b) to component (c) is from about 1:1 to about 1:10.

6. The composition of claim 1 in which component (a) is N,N-diethylhydroxylamine, component (b) is hydroquinone, and component (c) is diethylaminoethanol.

7. The composition of claim 6 in which the weight ratio of component (a) to component (c) is from about 5:1 to about 1:1 and the weight ratio of component (b) to component (c) is from about 1:1 to about 1:10.

8. A method for inhibiting corrosion of metal surfaces in water in an aqueous system comprising adding to the system water:

(a) at least one hydroxylamine compound having the general formula

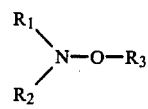

in which $R_1$, $R_2$ and $R_3$ are either the same or different and are selected from the group consisting of hydrogen, lower alkyl and aryl, or a water soluble salt of said hydroxylamine compound;

(b) at least one quinone or benzene compound having the general formula

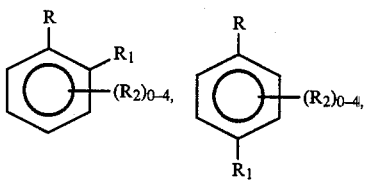

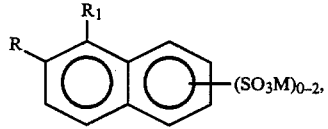

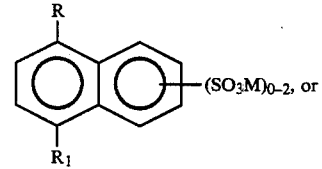

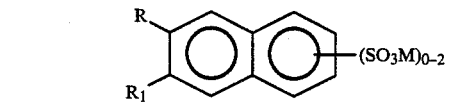

in which R and $R_1$ are independently selected from the group consisting of —OH, —$NH_2$; $R_2$ is lower alkyl containing 1 to 8 carbon atoms; and M is selected from the group consisting of H, Na, K and combinations thereof; and (c) at least one neutralizing amine; the weight ratio of the added hydroxylamine compound component to the added neutralizing amine component being between about 100:1 to about 1:1,500, and the weight ratio of the added quinone or benzene compound component to the added neutralizing amine component being between about 10:1 to about 1:100; and the total dosage of the hydroxylamine compound component, the quinone or benzene compound component, and the neutralizing amine component to the system water together being a corrosion-inhibiting amount between about 0.1 to about 1,500 parts per million.

9. The method of claim 8 in which component (a) is N,N diethylhydroxylamine.

10. The method of claim 9 in which component (b) is hydroquinone.

11. The method of claim 8 in which from about 0.1 to about 100 parts per million of the oxygen scavenger are added to the system.

12. The method of claim 8 in which the weight ratio of component (a) to component (c) is from about 10:1 to about 1:10 and the weight ratio of component (b) to component (c) is from about 5:1 to about 1:50.

13. The method of claim 8 in which the weight ratio of component (a) to component (c) is from about 5:1 to about 1:1 and the weight ratio of component (b) to component (c) is from about 1:1 to about 1:10.

14. The method of claim 8 in which component (a) is N,N-diethylhydroxylamine, component (b) is hydroquinone, and component (c) is diethylaminoethanol.

15. The method of claim 8 in which the water in the aqueous system has an alkaline pH.

16. The method of claim 8 in which the water in the aqueous system has a pH of greater than about 8.5

17. The method of claim 8 in which the aqueous system is a boiler water system.

18. The method of claim 8 in which the water comprises feedwater for a boiler.

19. The method of claim 8 in which the water comprises condensed steam in a boiler condensate system.

20. The method of claim 8 in which component (b) is hydroquinone.

* * * * *